(12) United States Patent
Bode et al.

(10) Patent No.: US 6,306,934 B1
(45) Date of Patent: Oct. 23, 2001

(54) AQUEOUS COATING COMPOSITION

(75) Inventors: Daniel Bode, Cleveland, OH (US); Deborah Howard, Tamworth (GB); Christopher Bradley; Martin Belton, both of Birmingham (GB)

(73) Assignee: Imperial Chemical Industries, Plc (GB)

( * ) Notice: Subject to any disclaimer, the term of this patent is extended or adjusted under 35 U.S.C. 154(b) by 0 days.

(21) Appl. No.: 09/280,639

(22) Filed: Mar. 29, 1999

(30) Foreign Application Priority Data

Apr. 4, 1998 (GB) .................................................. 9807213

(51) Int. Cl.$^7$ ............................... C08K 3/18; C08L 63/10
(52) U.S. Cl. ...................... 523/412; 523/409; 523/411; 523/413; 523/423; 524/504
(58) Field of Search ...................................... 523/407, 408, 523/410, 412, 409, 411, 413, 423; 524/504

(56) References Cited

U.S. PATENT DOCUMENTS

| | | |
|---|---|---|
| 4,683,273 | 7/1987 | Bode . |
| 5,464,885 | 11/1995 | Craun . |
| 5,532,297 | 7/1996 | Woo . |
| 5,648,410 | 7/1997 | Hille . |

FOREIGN PATENT DOCUMENTS

| | | |
|---|---|---|
| 629643 | 12/1994 | (EP) . |
| 640654 | 3/1995 | (EP) . |
| WO 9730097 | 8/1997 | (WO) . |

*Primary Examiner*—Ana Woodward
(74) *Attorney, Agent, or Firm*—Thomas M. Schmitz

(57) ABSTRACT

A protective coating composition for coating interior surfaces of beer, beverage, and food containers, as well as interior and exterior surfaces of can ends, comprises a polymeric binder of emulsion copolymerized ethylenic monomers in the presence of an unsaturated polyester dispersed into water with an aqueous dispersed epoxy-acrylic graft copolymer dispersant. The preferred polymeric binder comprises by weight between 0.1% and 40% unsaturated polyester, between 20% and 80% emulsion copolymerized ethylenic unsaturated monomers, and at least 20% dispersant, where the emulsion copolymerized monomers crosslink with the water dispersed unsaturated polyester.

11 Claims, No Drawings

AQUEOUS COATING COMPOSITION

This invention relates to aqueous coating compositions particularly useful as can coatings for beverage and food containers, a process for making the compositions and a process for using them.

Industrial coatings are surface protective coatings (paint coatings) applied to substrates and typically cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts theological properties to the fluid paint coating. Upon curing or crosslinking, the polymeric binder hardens and functions as a binder for the pigments and provides adhesion of the dried paint film to the substrate. The pigments may be organic or inorganic and functionally contribute to opacity and colour in addition to durability and hardness. Protective coatings which contain little or no opacifying pigments are described as clear coatings. The manufacture of protective coatings involves the preparation of a polymeric binder, mixing of component materials, grinding of pigments in the polymeric binder, and thinning to commercial standards.

Epoxy resins are particularly desirable for use in protective surface coatings materials as a vehicle or polymeric binder for the pigments, fillers, and other additives where the epoxy resins advantageously provide toughness, flexibility, adhesion, and chemical resistance. Water-dispersed coating compositions containing epoxy resins are highly desirable for can coating compositions and are particularly useful for interior surfaces of containers. Coatings for the interior of soft drink and beer cans, for instance, are critical due to taste sensitivity wherein such can coatings must not alter the product taste of beverages in the containers. Taste problems can occur in a variety of ways such as by leaching of coating components into the beverage, or by absorption of flavour by the coating, or sometimes by chemical reaction, or by perhaps some combination. The closure ends of cans are typically produced by stamping circular end caps from pre-coated flat metal where the top end ordinarily contains a stamped opening profile adapted to snap and roll back to provide an opening. The coating for ends must be resilient and avoid stringing while maintaining good interior resistance to the food or beverage contents.

Container coating technology frequently utilises an epoxy resin which has been grafted with acrylic monomers, styrene, and methacrylic acid. This grafted epoxy resin is prepared in solvent, usually butyl cellosolve and/or n-butanol, to maintain low processing viscosities and then reduced with water by a direct or inverse let down procedure. Although cured film properties are highly desirable, such coatings suffer from the fact that sizeable amounts of solvents are required to obtain good performance. High molecular weight epoxy resins typically require 25% to 50% solvent (based on total solids plus organic solvent) before reducing with amine and water. Also, epoxy coatings used for beverage or food containers raise a concern that such coatings may contain low molecular weight epoxy fragments which could leach out of the coating and into the contents of the container.

Epoxy based can coatings comprising a carbon grafted acrylic chain are disclosed in U.S. Pat. No. 4,212,781 which teaches a carbon grafting process involving solvent polymerisation at moderate temperatures with high levels of peroxide initiator to produce a carbon-graft polymer. The high solvent levels, however, invariably carry over to the aqueous dispersion when the resulting polymers are dispersed into water to produce a VOC (volatile organic compounds) level considerably above 2 and typically between 3 and 4 pounds volatile organic compounds per gallon of resin solids. The acrylic grafted epoxy is particularly useful when utilised with a co-reactive crosslinking melamine crosslinker.

PCT application WO 96/10612 discloses a can coating composition containing both water and organic solvent base on a polymer comprising the reaction of a carboxyl addition polymer and an epoxy resin in the presence of a tertiary amine catalyst. The epoxy and carboxyl addition polymer are pre-formed by co-reacting in organic solvent and subsequently dispersed into water. Similarly, U.S. Pat. No. 5,296,525 discloses can coatings based on styrene monomer copolyerised with an epoxy ester copolymer to provide a carboxyl functional polymer for subsequent dispersing into water.

U.S. Pat. No. 4,683,273 teaches an epoxy coating composition based on a polymeric blend of an epoxy-acrylic graft copolymer combined with a low molecular weight polyester and an amine crosslinking component. Upon heat curing the coating, the amine crosslinks co-reactive groups on the epoxy-acrylic graft polymer and the low molecular weight polyester.

U.S. Pat. No. 5,532,297 pertains to can coatings based on an epoxy-acrylic graft copolymer dispersed into water and subsequently overpolymerised with mono-ethylenically unsaturated monomers and minor amounts of divinyl benzene for crosslinking during the emulsion polymerisation step. Similarly, U.S. Pat. No. 5,464,885 discloses a carboxyl functional epoxy-ester comprising an epoxy esterified with an unsaturated polyester where the epoxy-ester is dispersed into water and subsequently emulsion copolymerised with ethylenically monomers.

It now has been found that high quality can coatings can be produced with little or no organic solvent and without epoxy resin fragments by pre-forming an unsaturated polyester, dispersing the polyester into water with an epoxy-acrylic graft copolymer dispersant, and then aqueous emulsion copolymerising with ethylenically unsaturated monomers. The resulting aqueous dispersed copolymer provides a highly flexible polymeric coating film with considerable physical and taste resistance to acidic beverages and sterilisation often required for food containers. An emulsion copolymer of polyester with copolymerised acrylic or vinyl monomers produces a coating composition particularly suitable for metal containers capable of being tooled into container end caps. On metal can interior surfaces, the coating provides good flavor resistance and maintains good resistance to sterilisation. The emulsion copolymer of this invention does not require conventional surfactants and avoids blush film problems associated with surfactants used in conventional latex polymerisation processes. These and other advantages of this invention will become more apparent by referring to the details of the invention.

According to the present invention there is provided an aqueous dispersed, protective coating composition containing an emulsion copolymer polymeric binder substantially free of volatile organic compounds, the polymeric binder comprising by weight:

(a) between 0.1% and 40% of a preformed, low molecular weight unsaturated polyester having a weight average molecular weight between 1000 and 3000, the unsaturated polyester synthesised by esterifying excess molar equivalents of polyol with lesser molar equivalents of dicarboxylic acid, at molar percents between, (i) excess of 50 mol percent polyol consisting of glycol,
(ii) 10 and 35 mol percent aliphatic dicarboxylic acid,
(iii) 5 and 35 mol percent aromatic dicarboxylic acid,
(iv) 5 and 25 mol percent unsaturated dicarboxylic acid,
(v) 0 and 3 mol percent polyol having three or more hydroxyl groups;

(b) at least 20%, preferably 20% to 80% of in-situ, emulsion copolymerised ethylenic monomers, where the ethylenic monomers comprise at least 20% styrene based on the weight of the ethylenic monomers copolymerised; and (c) between 20% and 80% carboxyl functional epoxy-acrylic graft copolymer dispersant, the copolymer dispersant having an Acid No. greater than 30, the copolymer dispersant being by weight 5% to 80% epoxy resin and 20% and 95% copolymerised ethylenically unsaturated monomer including carboxylic acid monomer, the graft copolymer dispersant produced by in-situ, non-aqueous polymerisation of the ethylenically unsaturated monomers in the presence of the epoxy resin and at least 3% peroxide initiator based on the weight of said monomers copolymerised, to produce the carboxyl functional, epoxy-acrylic graft copolymer dispersant;

where components (a), (b) and (c) equal 100%, and the polymeric binder is produced by dispersing the copolymer dispersant (c) into water, and the unsaturated polyester (a) and the monomers (b) being dispersed into water with the copolymer dispersant (c), and the monomers (b) emulsion copolymerised in the presence of the unsaturated polyester (a) to coreact with the unsaturated polyester to form the aqueous emulsion copolymer polymeric binder.

Referring first to the unsaturated polyester, useful polyesters in accordance with this invention comprise the esterification products of excess equivalents of glycols, diols, or polyols with lesser equivalents of dicarboxylic acid or anhydrides or polycarboxylic acids, where the polyester polymers are unsaturated polyesters containing ethylenic unsaturation. Linear aliphatic glycols are esterified with lesser equivalents of aromatic dicarboxylic acid and/or linear dicarboxylic acid having between 2 and 36 linear carbon atoms such as adipic, azelaic, succinic, glutaric, pimelic, suberic, or sebacic acid. Unsaturated dicarboxylic acids such as maleic, fumaric or itaconic acid are included to produce unsaturated polyesters. Although not preferred, minor amounts of monocarboxylic unsaturated acid such a acrylic, methacrylic or ethacrylic acid can be esterifed. For food contact coatings, preferred and commercially available linear saturated dicarboxylic acids are dimer fatty acids, or sebacic acid, or cyclohexane dicarboxylic acid, while preferred unsaturated carboxylic acids are maleic and fumaric. Aromatic dicarboxylic acids (anhydrides) include phthalic, isophthalic, terephthalic, and tetrahydrophthalic. Minor amounts of polyfunctional acids such as trimelletic acids can be added if desired. Suitable glycols include linear aliphatic glycols having 2 to 16 carbon atoms such as 1,3- or 1,4-butylene glycol, 2-methyl-1, 3 propanediol, 1,6-hexane diol, neopentyl glycol, propylene glycol, ethylene glycol and diethylene glycol, propylene, and dipropylene glycol, and similar linear glycols. Preferred glycols are diethylene glycol, neopentyl clycol, and 2-methyl-1, 3 propane diol. Although not desirable, minor amounts of polyols can be used such as glycerol, pentaerythritol, dipentaerythritol, or trimethylol ethane or propane. The molar excess of the glycol over the molar amounts or aromatic and linear saturated dicarboxylic acid is between about 2% and 25% and preferably between about 3% and 10%. Preferably between 20 and 50 molar percent of the carboxylic acid components comprises ethylenically unsaturated dicarboxylic acid. The weight average molecular weight of useful unsaturated polyester polymers is preferably between 1500 and 2500.

In accordance with this invention, the polyester polymer is considerably different from conventional unsaturated polyesters in that the amount of ethylenic unsaturation in the polyester can be lower than normal and the number average molecular weight can be lower than conventional polyesters. The amount of unsaturation is controlled by limiting the relative percent of unsaturated dicarboxylic acid to between 5 and 20 weight percent of total polyester. The molecular weight of the polyester can be controlled by the ratio of total moles of glycol to total moles of dicarboxylic acid.

A further characteristic of the unsaturated polyester is that it must be essentially compatible with aliphatic acrylic or vinyl monomer in contrast with conventional polyesters being primarily compatible with aromatic styrene. Since considerable amounts of vinyl and/or acrylic monomers are copolymerised with the unsaturated polyester in accordance with this invention, the unsaturated polyester must contain polymeric units capable of solubility in the monomer mixture. Hence, less polar monomer components such as dimer acid, sebacic acid, or cyclohexane dicarboxylic acid should be added to the unsaturated polyester formulation to avoid forming an undesirable sludge when mixed with the ethylenic monomers.

Hydroxyl functional polyesters can be prepared by esterification of the dicarboxylic acids with the dihydroxy or glycol compounds. The unsaturated polyester component can be synthesised by bulk polymerisation, where the raw materials are charged in bulk and esterified at temperatures typically between 170° C. and 240° C., although moderately higher or lower temperatures can be utilised satisfactorily. An esterification catalyst can be used, typically an organic tin compound at less than 1% levels based on weight of the charge.

The unsaturated polyester prepolymer can be dissolved in acrylic and/or vinyl monomer to reduce the resin viscosity and render the polyester more easily dispersible in water. Lower molecular weight and lower viscosity unsaturated polyesters can be dispersed directly into water whereupon the ethylenic monomers can be added to the aqueous dispersion of polyester. The unsaturated polyester can be dispersed into water in the presence of a suitable dispersant, such as preferred water dispersed epoxy-acrylic graft copolymer having carboxyl groups neutralised with amine or ammonia.

Ethylenic monomers suitable for aqueous polymerisation with the unsaturated polyester comprise monomers containing carbon-to-carbon, ethylenic unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, vinyl naphthalene, divinyl benzoate, and cyclohexene. Vinyl aliphatic hydrocarbon monomers include alpha olefins such as ethylene, propylene, isobutylene, and cyclohexene as well as conjugated dienes such as 1,3 butadiene, methyl-2 butadiene, 1,3-piperylene, 2,3-dimethyl butadiene, isoprene, cyclopentadiene, and dicyclopentadiene. Vinyl alkyl ethers include methyl vinylether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxy propyl acrylates and methacrylates, as well as amino acrylates and methacrylates. Carboxylic acid functional monomers can be included, if desired such as acrylic and methacrylic acids. Ethylenic monomer mixtures of acrylic and/or methacrylic esters with styrene are preferred. Styrene copolymerises very efficiently with the double bond unsaturation in the polyester. On a weight basis of total ethylenic monomers, the ethylenic monomers preferably comprise between 20% and 100% styrene monomers, preferably between 30% and 70% styrene, with the balance being other ethylenic monomers. At least 20% by weight should preferably be styrene monomer to assure copolymerisation and covalent linking to the unsaturated polyester.

The number average molecular weight of the emulsion polyester copolymer ordinarily is well above 50,000.

In accordance with the process of this invention, the unsaturated polyester is dispersed into water and copolymerised in the presence of a polymeric stabiliser. Preferred polymeric stabilisers comprise an epoxy-acrylic graft copolymer of the polymeric type taught in U.S. Pat. No. 4,212,781. In this regard, epoxy resin is reacted with ethylenic monomer in the presence of at least 3% by weight benzoyl peroxide based on monomer weight, or free radical initiating equivalent peroxide, at a temperature preferably between about 80° C. to 120° C. to produce an epoxy-acrylic graft copolymer. In practice, the epoxy-acrylic graft copolymer is prepared in solvent and then subsequently dispersed into water using a fugitive base such as primary, secondary, and tertiary alkyl, alkanol, aromatic amines, or alkanolalkyl mixed amines such as mono-ethanol amine, dimethyl ethanol amine, diethanol amine, triethyl amine, dimethyl aniline, ammonium hydroxide, and the like.

The epoxy resin useful in preparing the epoxy-acrylic graft copolymer dispersant can be either aliphatic or aromatic, although the aromatic epoxy resins are preferred. The most preferred epoxy resins are polyglycidyl ethers of bisphenol-A, especially those having 1,2-epoxy equivalency between about 1.3 to about 2. The molecular weight should be from about 350 to about 20,000 and preferably from about 2,000 to about 10,000. Mixtures of monoepoxides and diepoxides are desirable, which maximises compatibility. Epoxy resins useful in the epoxy-acrylic graft copolymer are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4'dihydroxy bisphenol, with the most preferred being bisphenol-A. Halohydrins include epichlorohydrin, dichlorohydrin, and 1,2-dichloro 3-hydroxypropane with the most preferred being epichlorohydrin. Preferred epoxy resins comprise the coreaction product of excess molar equivalents of epichlorohydrin and bisphenol-A to produce predominantly an epoxy group terminated linear molecular chain of repeating units of diglycidyl ether of bisphenol-A containing between 2 and 25 repeating copolymerised units of diglycidyl ether of bisphenol-A. In practice, excess molar equivalents of ephichlorohydrin are reacted with bisphenol-A to produce epoxy resins where up to two moles of epichlorohydrin coreact with one mole of bisphenol-A. Less than complete reaction can produce difunctional epoxy resin along with monoepoxide chains terminated at the other end with a bisphenol-A unit. The most preferred linear epoxy resins are poly-glycidyl ethers of bisphenol-A having an epoxy equivalent weight between 2,000 and 10,000, and a number average molecular weight from about 4,000 to 20,000 as measured by gel permeation chromatography (GPC).

The acrylic portion of the epoxy-acrylic graft copolymer comprises polymerised ethylenically unsaturated monomers which include carboxyl functional monomers such as acrylic acid, lower alkyl substituted acrylic acids such as methacrylic acid, and unsaturated dicarboxylic acids such as maleic or fumaric, to provide carboxyl functionality for dispersing the epoxy-acrylic copolymer mixture into water. The preferred acrylic acid is methacrylic acid. The balance of the monomers preferably are non-functional under the contemplated conditions of polymerisation, although small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers are non-functional but copolymerisable ethylenic monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers alkyl acrylate esters and methacrylate esters such as, for example propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene, vinyl toluene, divinyl benzene, isoprene and butadiene. The acrylic, methacrylic or similar ethylenic carboxyl monomer preferably comprises by weight between about 5% and 40% based on the weight of the acrylic grafted epoxy copolymer.

The preferred epoxy-acrylic graft copolymer mixture is prepared by in-situ non-aqueous polymerisation of the ethylenic monomers with epoxy resin. The epoxy resin can be heated in a reactor wherein the polymerisable monomer can be added slowly over a period of at least two or three hours along with a solvent and a free radical initiator. Although the reaction may be conducted in the absence of a solvent, some solvent is desirable for the in-situ polymerisation of monomers in the presence of epoxy resin. Solvents such as xylene, benzene, ethyl benzene, toluene, and the alkoxy alkanols are satisfactory. Alcohols such as methanol, ethanol, propanol, butanol, and the like, are suitable, with ethylene glycol monobutyl ether and butanol being preferred. Ethylene glycol monobutyl ether, ethylene glycol monohexyl ether, diethylene glycol monobutyl ether, and the like are most suitable. For subsequent dispersion into water, the solvents selected should be water-soluble materials, such as butanol, propanol, ethylene glycol monoethyl ether, and the like, although small amounts of mineral spirits, hexane, and similar aliphatics may be used.

In accordance with the process of the invention, the epoxy-acrylic graft copolymer dispersant is first dispersed into water by either direct or reverse let down. The preformed unsaturated polyester is then dispersed into the aqueous medium to form a water dispersion of-graft copolymer dispersant and unsaturated polyester. The ethylenically unsaturated monomers can be added separately to the water dispersion over a period of time, but preferably are added with the unsaturated polyester to provide increased fluidity to the unsaturated polyester and improve dispensability into water. The ethylenically unsaturated polyester and improve dispensability into water. The ethylenically unsaturated monomers are copolymerised in the aqueous polymerisation medium assisted with polymerising initiators. Initiators can include for example, typical free radical and redox types such as hydrogen peroxide, t-butyl hydroperoxide, di-t-butyl peracetate, azobisisobutryronitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate, etc. The polymerisation initiators are usually added in amounts between about 0.1 to 2 weight percent based on the monomer additions, although higher levels can be utilised. The polymerisations process is continued until the ethylenically unsaturated monomers are completely copolymerised.

The resulting polymeric binder can be combined with other paint ingredients for spray or roller application to metal substrates. For spraying, preferably the coating composition contains between about 10% and 40% by weight polymeric solids relative to 60% to 90% water including other volatiles such as minor amounts of solvents. Minor amounts of organic solvents can be utilised to facilitate spray or other application methods and such solvents preferably include n-butanol and 2-butoxy-ethanol-1, with lesser amounts of aromatic naphtha, ethyl benzene, xylene, and toluene. Preferably n-butanol is used in combination with 2-butoxy-ethanol-1. For applications other than spraying, such as roller coating, the aqueous polymeric dispersions can contain between about 5% and 50% by weight of polymer solids. The coating composition of the present invention can be pigmented and/or opacified with known pigments and opacifiers. For many uses, including food use, the preferred pigment is titanium dioxide. For interior of beer and beverage cans, clear coatings with minimal or no pigmentation are useful. Thus, spraying, rolling, dipping, and flow coating application methods can be used for both clear and pigmented films. After application onto the metal substrate, the coating is cured thermally at temperatures in the range from about 150° C. to 220° C. or higher for time sufficient to effect complete curing as well as volatising of any fugitive component therein.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil. Cured coating films exhibit excellent water resistance, good clarity and gloss, good flexibility, as well as good blush resistance to sterilisation and acidic foods and beverages.

For a better understanding of the present invention, the following examples are provided. In this application, all parts are by weight, all percentages are weight percentages, and temperatures are degrees Centigrade, unless otherwise expressly noted.

EXAMPLES

Example 1
Preparation of Polyester Acrylic Copolymer

| Material | Weight (kg) |
| --- | --- |
| A: EPOXY-ACRYLIC GRAFT DISPERSANT | |
| 1. DER 331 Epoxy | 100.10 |
| 2. Dipheno Propane (DPP) | 55.60 |
| 3. Butyl Oxitol | 29.04 |
| 4. Phosphonium Acetate | 0.15 |
| 5. Butyl Oxitol | 0.51 |
| 6. Distillate | −2.17 |
| 7. Deionised water (DI) | 0.20 |
| 8. Butyl Oxitol | 5.61 |
| 9. Butanol | 38.53 |
| 10. Methacrylic Acid | 29.25 |
| 11. Styrene | 37.51 |
| 12. Ethyl Acrylate | 0.75 |
| 13. Benzoyl Peroxide (75%) | 4.66 |
| 14. Butyl Oxitol | 12.29 |
| 15. Butyl Oxitol | 6.25 |
| 16. Dimethyl Ethanol Amine (DMEA) | 18.58 |
| 17. D.I. Water | 371.61 |
| 18. D.I. Water | 13.38 |
| B: DISPERSED POLYESTER ACRYLIC COPOLYMER | |
| 19. Polyester Intermediate 1.1 | 14.78 (preformed below) |
| 20. Styrene | 28.27 |
| 21. Butyl Acrylate | 40.37 |
| 22. t-Butyl Peroctoate | 1.61 |
| 23. Hexyl Glycol | 0.34 |
| 24. Butanol | 5.17 |
| 25. t-Butyl Peroctoate | 1.16 |
| 26. Hexyl Glycol | 0.34 |
| 27. Butanol | 5.17 |
| 28. Cymel 370 (Melamine) | 31.63 |
| 29. Amine blocked dodecyl benzene sulfonic acid | 5.45 |
| 30. D.I. Water | 143.19 |
| | 1000.00 |

Procedure

SET FOR VACUUM DISTILLATION; Charge components (1)+(2)+(3), and heat to 50° C. Add components (4)+(5), and apply vacuum (better than 75 mb). Heat to Distillation, and remove at least stated quantity of Distillate (6). Ordinarily vacuum is reduced to a level such that all the distillate is remove without exceeding 120° C. Break vacuum with Nitrogen and replace excess distillate with Butyl Oxitol (8).

SET FOR DIRECT REFLUX; Heat to 175–180° C. slowly. Hold at 175–180° C. and sample for Cone & Plate @ 200° C. of 50–60 poise. When at viscosity take final sample, then add deionized water (7) and reheat to 175–180° C. Hold for 30 minutes, then cool and thin with Butyl Oxitol (8) and Butanol (9). Cool to 115–118° C., then add items 10 to 14 (PREMIXED) to reactants (1–9) over 2.5 hours. Rinse in with Butyl Oxitol (15) and hold for a further 30 minutes at 115–118° C.

To a separate vessel, charge DMEA (16) and DI water (17), and heat to 90–93° C. These items should be held for 30 minutes at this temperature, and then mixed with reactants (1–15) by adding the reactants slowly to preheated mixture (16+17) and with good stirring in order to ensure a good emulsion is formed. Some minimal loss of reactants (1–15) can be expected due to the transfer between vessels. Thin resulting mixture to approximately 31.5% (200° C./10 min/1 g) with DI water (18). The resulting water dispersed resin is an epoxy-acrylic graft copolymer dispersant used in the formation of the emulsion polyester acrylic copolymer as follows.

Reheat reactants (1–18) to 90–93° C. and add materials (19), (20) and (21), and hold at 90–93° C. for 45 minutes. Premix components (22), (23) and (24) and then add to reactants (1–21), and hold for a further 3 hours @ 90–93° C. Premix components (25), (26) and (27) and then add to reactants (1–24), and hold for a further 1.5 hours @ 90–93° C. Cool reactants (1–27) to less than 40° C and then check NVM 35–37% (200° C./10 min/1 g). Add components (28), (29) and (30) and then thin to 45–55 seconds BSB4 @ 25° C. with Nacure 29. The NVM should be 31–33% (200° C./10 min/1 g).

C: Preparation of Polyester Intermediate 1.1 Used as Component (19) in Example 1

| Item | Material | Weight |
|---|---|---|
| 1. | Diethylene Glycol | 228.61 |
| 2. | Isophthalic Acid | 292.89 |
| 3. | Butyl Stannoic Acid | 0.86 |
| 4. | Diethylene Glycol | 168.11 |
| 5. | Maleic Anhydride | 172.40 |
| 6. | Xylol | 19.59 |
| 7. | Cyclohexane | 117.54 |
| | | 1000.00 |

Procedure

Set reactor for Fractional Distillation and then add components (1), (2) and (3) to the reactor. Heat to Distillation and continue heating removing distillate (keep column head temperature below 105° C.) until a clear sample is obtained. Reaction temperature should not exceed 220° C. Cool to 180° C. and add component (4), heat to 165° C., then add component (5), followed by reheating to 220° C. removing distillate (keep column head temperature below 105° C.). When column head temperature drops below 90° C. change from a fractionating column to a plain column. Sample reactants for Acid Value of less than 40 mgKOH/g and change to reflux and maintain a reflux at 220° C. Sample for Acid Value of 15–18 mgKOH/g. Cool and thin with component (7).

Example 2
Preparation of Polyester-Acrylic Copolymer

| Material | Weight (kg) |
|---|---|
| A: PREPARATION OF EPOXY-ACRYLIC GRAFT DISPERSANT | |
| 1.DER 331 (Epoxy) | 105.66 |
| 2.D.P.P. | 58.63 |
| 3.Butyl Oxitol | 30.62 |
| 4.Phosphonium Acetate | 0.16 |
| 5.Butyl Oxitol | 0.53 |
| 6.Distillate | -2.29 |
| 7.D.I.Water | 0.44 |
| 8.Butyl Oxitol | 5.19 |
| 9.Butanol | 40.62 |
| 10.Methacrylic Acid | 30.85 |
| 11.Styrene | 39.55 |
| 12.Ethyl Acrylate | 0.79 |
| 13.Benzoyl Peroxide (75% damped) | 4.91 |
| 14.Butyl Oxitol | 12.96 |
| 15.Butyl Oxitol | 6.59 |
| 16.D.M.E.A. | 19.59 |
| 17.D.I. Water | 391.84 |
| 18.D.I. Water | 14.11 |
| B: PREPARATION OF POLYESTER ACRYLIC COPOLYMER | |
| 19.Polyester Intermediate 2.1 | 10.88 (preformed below) |
| 20.Styrene | 20.48 |
| 21.Butyl Acrylate | 29.26 |
| 22.Triganox 21 | 1.17 |
| 23.Hexyl Glycol | 0.33 |
| 24.Butanol | 5.49 |
| 25.t-Butyl Peroctoate | 1.17 |
| 26.Hexyl Glycol | 0.33 |
| 27.Butanol | 5.49 |
| 28.Cymel 370 | 30.56 |
| 29.Amine blocked dodecyl benzene sulfonic acid | 5.24 |
| 30.D.I.Water | 128.23 |
| | 1000.00 |

The processing procedure for the above components was the same as Example 1.

C: Preparation of Polyester Intermediate 2.1 for Use as Component (19) in Example 2

| Item | Material | Weight |
|---|---|---|
| 1. | Diethylene Glycol | 295.47 |
| 2. | Isophthalic Acid | 389.08 |
| 3. | Butyl Stannoic Acid | 0.86 |
| 4. | Diethylene Glycol | 85.57 |
| 5. | Maleic Anhydride | 85.57 |
| 6. | Xylol | 10.67 |
| 7. | Cyclohexane | 132.78 |
| | | 1000.00 |

Procedure

Set for Fractional Distillation Charge components (1), (2) and (3), and heat to Distillation. Continue heating removing distillate (keep column head temperature below 105° C.) until a clear sample is obtained. The reaction temperature should not exceed 220° C. Cool to 180° C. and add Diethylene glycol (4). Upheat to 165° C. and then add maleic anhydride (5), and reheat to 220° C. removing distillate (keep column head temperature below 105° C.). When column head temperature drops below 90° C. change from a fractionating column to a plain column. Sample reactants for Acid Value of less than 40 mgKOH/g, change to flux set up and add xylol (6) to maintain a reflux at 220° C. Sample for Acid Value of 15–18 mgKOH/g. Cool and thin with Cyclohexanone (7).

Example A

Reference material epoxy polyester with N-i-BMA in aqueous stage polymerisation

| Material | Weight |
|---|---|
| 1. DER 331 Epoxy resin | 109.14 |
| 2. D.P.P. | 60.62 |
| 3. Butyl Oxitol | 31.66 |
| 4. Phosphonium Acetate | 0.16 |
| 5. Butyl Oxitol | 0.55 |
| 6. Distillate | −2.36 |
| 7. D.I. Water | 0.46 |
| 8. Butyl Oxitol | 6.12 |
| 9. Butanol | 40.01 |
| 10. Methacrylic Acid | 31.90 |
| 11. Styrene | 40.89 |
| 12. Ethyl Acrylate | 0.81 |
| 13. Benzoyl Peroxide (75% damped) | 5.07 |
| 14. Butyl Oxitol | 13.39 |
| 15. Butyl Oxitol | 6.81 |
| 16. D.M.A.E. | 22.15 |
| 17. D.I. Water | 405.15 |
| 18. D.I. Water | 14.58 |
| 19. N-iso butoxy methyl acrylamide | 12.05 |
| 20. Ethyl Acrylate | 48.20 |
| 21. t-Butyl Peroctoate | 1.21 |
| 22. Hexyl Cellosolve | 0.34 |
| 23. Butanol | 5.62 |
| 24. t-Butyl Peroctoate | 1.21 |
| 25. Hexyl Cellosolve | 0.34 |
| 26. Butanol | 5.65 |
| 27. Cymel 370 | 31.34 |
| 28. Nacure 5925 | 1.39 |
| 29. D.I. Water | 99.51 |
| | 1000.00 |

The Procedure was as in Example 1, except: Reheat items (1) to (18) to 90–93° C. and add 19 to 20 then hold at 90–93° C. for 45 minutes. Add (21), (22) and (23) Premixed, and hold for a further 3 hours @ 90–93° C. Add (24), (25) and (26) Premixed, and hold for a further 1.5 hours @ 90–93° C. Cool to less than 40° C. Check NVM 35–37% (200° C./10 min/1 g). Add components (27), (28) and (29). Thin reactants to 45–55 seconds Bss4 @ 25° C. with DI water (29). NVM should be 31–33% (200° C./10 min/1 g).

The following Table 1 reports physical properties of coated panels with films formed from the foregoing Examples 1, 2 and A.

TABLE 1

| Test | Example 1 | Example 2 | Reference Example A |
|---|---|---|---|
| MEK cure | >100 | >100 | >100 |
| Wedge bend flexibility | 89 | 90 | 80 |
| Sterilisation blush | 2 | 1 | 1 |
| Sterilisation adhesion | 1 | 1 | 1 |
| Enamel rater 206 shell | 0.85 | 1.12 | 1.42 |
| Post-sterilisation ER | 3.01 | 1.15 | 3.56 |

Example 3
Preparation of Polyester Acrylic Copolymer

| Material | Weight (kg.) |
|---|---|
| A: EPOXY-ACRYLIC GRAFT DISPERSANT | |
| 1. DER 331 | 117.08 |
| 2. D.P.P. | 64.24 |
| 3. Butyl Oxitol | 22.85 |
| 4. Phosphonium Acetate | 0.18 |
| 5. Butyl Oxitol | 0.66 |
| 6. Distillate | −3.32 |
| 7. D.I. Water | 0.13 |
| 8. Butyl Oxitol | 11.63 |
| 9. Butyl Oxitol | 48.79 |
| 10. Methacrylic Acid | 34.63 |
| 11. Styrene | 42.00 |
| 12. Ethyl Acrylate | 0.84 |
| 13. Benzoyl Peroxide (75% damped) | 5.34 |
| 14. Butyl Dioxitol | 17.01 |
| 15. Butyl Oxitol | 4.25 |
| 16. D.M.E.A. | 18.43 |
| 17. D.I. Water | 426.63 |
| 18. D.I. Water | 22.83 |
| B: DISPERSED POLYESTER ACRYLIC COPOLYMER | |
| 19. Polyester Intermediate 3.1 | 14.03 (preformed below) |
| 20. Styrene | 17.78 |
| 21. Butyl Acrylate | 31.80 |
| 22. t-Butyl Preoctoate | 1.27 |
| 23. Butyl Dioxitol | 5.17 |
| 24. Butanol | 1.15 |
| 25. t-Butyl Preoctoate | 1.27 |
| 26. Butyl Dioxitol | 6.31 |
| 27. Cymel 370 | 32.31 |
| 28. Amine blocked dodecyl benzene sulfonic acid | 1.43 |
| 29. D.I. Water | 53.28 |
| | 1000.00 |

Procedure

SET FOR VACUUM DISTILLATION; Charge components (1), (2) and (3) and heat to 50° C. Add components (4) and (5) and apply vacuum (better than 75 mb). Heat to Distillation, and remove at least stated quantity of Distillate. Break vacuum with Nitrogen and replace excess distillate with Butyl Oxitol while distillate is removed without exceeding 120° C.).

SET FOR DIRECT REFLUX; Heat reactants to 175–180° C. slowly and hold at 175–180° C. for viscosity sample for Cone & Plate @ 200° C. of 50–60 poise. When at viscosity take final sample, then components (7) and (8), and reheat to 175–180° C. Hold for 30 minutes, then cool and thin with component (9). Cool to 115–118° C., then add items (10) to (14) (PREMIXED) to reactants (1) to (9) over 2.5 hours. Rinse in with Butyl Oxitol (15) and hold for a further 30 minutes at 115–118° C. Add DMEA (16) and hold at 100–105° C. for 30 minutes. Add DI water (17) slowly to ensure a good emulsion, then thin to approximately 31.5% (200° C.10 min/1 g) with DI water (18). Premix components (19), (20) and (21) and add to reheated reactants (1) to (18) to 90–93° C. and hold at 90–93° C. for 45 minutes. Add components (22), (23) and (24) (Premixed), and hold for a further 3 hours @ 90–93° C. Add components (25) and (26) (Premixed), and hold for a further 1.5 hours @ 90–93° C. Cool reactants to less than 40° C. Check NVM 25 34–35% (200° C.10 min/1 g). Add components (27) and (28), and then thin 45–55 seconds BSB4 @ 25° C. with DI water (29). NVM should be 33–35% (200° C./10 min/1 g).

C: Preparation of Polyester Intermediate 3.1 for Use as Component (19) in Example 3

| Item | Material | Weight |
|---|---|---|
| 1. | Diethylene Glycol | 673.4 |
| 2. | Isophthalic Acid | 664.9 |
| 3. | Butyl Stannoic Acid | 1.95 |
| 4. | Sebacic Acid | 269.7 |
| 5. | Diethylene Glycol | 195.0 |
| 6. | Maleic Anhydride | 195.0 |
| 7. | 1,4-Benzoquinone, 98% | 0.33 |
| 8. | Styrene | 740.5 |
| | | 2740.78 |

Procedure

Set for Fractional Distillation. Charge components (1), (2) and (3), then heat to Distillation. Continue heating removing distillate (keep column head temperature below 105° C.) until a clear sample is obtained without reactants exceeding 220° C. Cool to 180° C. and add Sebacic Acid (4). Reheat to 220° C. removing distillate (keep column head temperature below 105° C). Sample reactants for Acid Value of less than 20 mgKOH/g. Cool to 180° C. and add Diethylene Glycol (5), then add Maleic Anhydride (6), when the temperature is below 165° C. Reheat to 220° C. and hold @ 220° C. for 1 hour (removing any distillate produced). Change over to Dean and Stark reflux, and add Xylol to maintain a good reflux. Sample reactants for Acid Value of 15–18 mgKOH/g. Cool to 100° C. and add the polyester to premixed components (7) and (8), but do not allow the resulting reaction mixture temperature to exceed 50° C.

Physical Characteristics

Acid Value. 15–18 mgKOH/g.

Solid Content: 67–68% (200° C./10 minutes/1 g)

Example 4

A: PREPARATION OF AN ALTERNATIVE POLYESTER ACRYLIC COMPOSITION USING POLYESTER INTERMEDIATE 4.1 AS FOLLOWS

| Item | Material | Weight |
|---|---|---|
| 1. | Diethylene Glycol | 673.4 |
| 2. | Isophthalic Acid | 531.9 |
| 3. | Butyl Stannoic Acid | 1.95 |
| 4. | 1,4-Cyclohexanedicarboxylic Acid | 363.1 |
| 5. | Diethylene Glycol | 195.0 |
| 6. | Maleic Anhydride | 195.0 |
| 7. | 1,4-Benzoquinone, 98% | 0.33 |
| 8. | Styrene | 720.5 |
| | | 2681.18 |

Processing Procedure: same as in Example 3.1

Physical Characteristics of Resulting Dispersant Resin

Acid Value: 15–18 mgKOH/g; Solid Content: 67–68% (200° C./10 minutes/1 g)

Upon adding preformed polyester 4.1 to the dispersant (1 to 18), components (19), (20) and (21) can be pre-mixed for easier processing. Polyester 4.1 was substituted into the composition of Example 3 to give the following film test results in Table 2.

TABLE 2

| Test | Polyester 4.1 in Example 3 | Example 3 |
|---|---|---|
| MEK cure | >100 | >100 |
| Wedge bend flexibility | 90% | 85% |
| Sterilisation blush | ½ | ½ |
| Sterilisation adhesion | 1 | 1 |
| Enamel rater 206 shell | 0.60 | 1.57 |
| Post-sterilisation ER | 1.48 | 1.73 |

Examples 5 and 6

Components were reacted in the procedure indicated in a manner similar to Examples 1 to 4.

| | | Example 4 | Example 5 |
|---|---|---|---|
| A | DER331 Epoxy | 49.67 | 49.67 |
| B | 2-Phenyl Imidazole | 0.0037 | 0.0037 |
| B | Solvesso 100 | 0.15 | 0.15 |
| C | Bisphenol A | 27.34 | 27.34 |
| C | Solvesso 100 | 4.05 | 4.05 |
| D | Hexyl Cellosolve | 3,019 | 3.19 |
| D | Butyl Cellosolve | 16.48 | 16.48 |
| D | n-Butanol | 20.42 | 20.42 |
| E | Methacrylic Acid | 14.24 | 14.24 |
| E | Styrene | 8.58 | 8.58 |
| E | Ethyl Acrylate | 0.18 | 0.18 |
| E | BPO-78% | 2.24 | 2.24 |
| E | Hexyl Cellosolve | 4.95 | 4.95 |
| F | Dimethyl ethanol amine | 9.09 | 9.09 |
| F | De-ionized Water | 9.09 | 9.09 |
| G | De-ionized Water | 486.97 | 486.97 |
| H | Styrene | 8.33 | 15 |
| H | Butyl Acrylate | 15 | 15 |
| H | Polyester example 4.1 | 6.66 | |
| I | t-Butyl PerOctoate | 0.6 | 0.6 |
| J | Styrene | 36.67 | 36.67 |
| K | t-Butyl PerOctoate | 0.73 | 0.73 |
| L | Butanol | 7.94 | 7.94 |
| L | De-ionized Water | 171.39 | 171.39 |
| L | Dimethyl ethanol amine | 4.78 | 4.78 |

1) Heat A in a flask to 70° C. and add B.
2) Continue to heat to 90° C. and then add C.
3) Heat to 195° C. and hold until an EEW of 2700–3500 is achieved.
4) Add D and cool to 118° C.
5) Pre-mix E and add to the flask over 2 hours.
6) Hold 118° C. after E feed is completed.
7) Cool to 95° C. and add F.
8) Maintain 95° C. for 45 minutes.
9) Add G over 60–90 minutes to emulsify; maintain 90° C. minimum.
10) Add H and mix for 45 minutes.
11) Add I and hold for 3 hours.
12) Add J and mix for 45 minutes.
13) Add K and hold for 3 hours.
14) Cool to 30° C. and add L. Mix well.
15) Filter.

Resin film samples from Examples 4 and 5 were tested and the results are shown in Table 3 as follows.

TABLE 3

| | Example 4 | Example 5 (no polyester) |
|---|---|---|
| Non-volatile content | 18.9% | 19.0% |
| Viscosity (sec #4 Ford cup) | 18 | 18 |

TABLE 3-continued

|  | Example 4 | Example 5 (no polyester) |
|---|---|---|
| Pine Oil (mg adsorbed) | 5.5 | 3.7 |
| Limonene (mg adsorbed) | 1.9 | 3.8 (heavy blush) |

Viscosity and NV for 12040-16A and 12040-16B were 18"/19% and 18"/18.9%, respectively.

Two odour absorption tests, Pine Oil and Limonene, were done as follows. Formulations were drawn down on Al Foil strips and baked for 30" at 360° F.; then coated on the opposite side and baked for 60" at 360° F. 4 in×5 in coupons were made from the coated strips and hole punched; then weighed. Typically six coupons were hung from a rod through the punched holes above a solution of ½ g per gallon of either Pine Oil or Limonene for 3 days at 100° F. in an oven. When the exposure was complete the coupons were reweighed and the difference reported in milligrams. Any blushing or haziness was also recorded.

The foregoing detailed description and illustrative examples illustrate the merits of the invention but are not intended to limit the scope of the invention, except by the appended claims.

What is claimed is:

1. An aqueous dispersed protective coating composition containing an emulsion copolymer polymeric binder substantially free of volatile organic compounds, the polymeric binder comprising by weight:
   (a) between 0.1% and 40% of a preformed low molecular weight unsaturated polyester having a weight average molecular weight between 1000 and 3000, the unsaturated polyester sythesised by esterifying excess molar equivalents of glycol and polyol with lesser molar equivalents of dicarboxylic acid at molar percents of
      (i) greater than 50 molar percent of glycol,
      (ii) 10 to 35 molar percent of aliphatic dicarboxylic acid,
      (iii) 5 to 35 molar percent of aromatic dicarboxylic acid,
      (iv) 5 to 25 molar percent of unsaturated dicarboxylic acid, and
      (v) 0 to 3 molar percent of polyol having three or more hydroxyl groups;
   (b) at least 20% of in-situ emulsion polymerised ethylenically unsaturated monomers polymerised in the presence of the preformed polyester (a), where the ethylenically unsaturated monomers comprise at least 20% styrene based on the weight of the ethylenically unsaturated monomers polymerised; and
   (c) between 20% and 80% carboxyl functional epoxy-acrylic graft copolymer dispersant having an Acid No. greater than 30, the copolymer dispersant being by weight 5% to 80% epoxy resin grafted with 20% to 95% polymerised ethylenically unsaturated monomer including carboxylic acid monomer, the graft copolymer dispersant produced by non-aqueous copolymerisation of said monomers in the presence of the epoxy resin and at least 3% peroxide initiator based on the weight of the monomers polymerised, to produce the copolymer dispersant, and dispersing the graft copolymer dispersant into water; where components (a), (b), and (c) equal 100%, and the polymeric binder is produced by dispersing the unsaturated polyester (a) and the ethylenically unsaturated monomers (b) into water with the copolymer dispersant (c), and where the ethylenically unsaturated monomers (b) are emulsion copolymerised in the presence of the unsaturated polyester (a) to coreact with the unsaturated polyester and form the aqueous emulsion copolymer polymeric binder.

2. The coating composition of claim 1 wherein component (b) comprises between 20% and 80% by weight of the polymeric binder.

3. The coating composition of claim 1, wherein the ethylenically unsaturated monomers in component (b) comprise between 20% and 100% styrene based on the weight of said monomers copolymerised.

4. The coating composition in claim 1, wherein the ethylenic monomers in component (b) comprise between 30% and 70% styrene based on the weight of said monomers copolymerised.

5. The coating composition of claim 1, wherein component (a), between 20 and 50 molar percent of the dicarboxylic acid components comprise unsaturated dicarboxylic acid.

6. The coating composition of claim 1, wherein the weight average molecular weight of component (a) is between 1500 and 2500.

7. The coating composition of claim 1, wherein the polymeric binder is produced by dispersing component (c) into water to form a water dispersion of component (c), where component (a) is then dispersed into the water dispersion of component (c), followed by in-situ copolymerisation of component (b).

8. An aqueous dispersed, protective coating composition containing an emulsion copolymer polymeric binder substantially free of volatile organic compounds, the polymeric binder comprising by weight:
   (a) between 0.1% and 40% of a preformed, low molecular weight unsaturated polyester having a weight average molecular weight between 1000 and 3000, the unsaturated polyester synthesised by esterifying excess molar equivalents of glycol and polyol with lesser molar equivalents of dicarboxylic acid, at molar percents between
      (i) greater than 50 mol percent of glycol,
      (iii) 10 and 35 mol percent aliphatic dicarboxylic acid,
      (iii) 5 and 35 mol percent aromatic dicarboxylic acid,
      (iv) 5 and 25 mol percent unsaturated dicarboxylic acid,
      (v) 0 and 3 mol percent polyol having three or more hydroxyl groups;
   (b) at least 20% of in-situ, emulsion copolymerised ethylenically unsaturated monomers, where the ethylenically unsaturated monomers comprise at least 20% styrene based on the weight of the ethylenically unsaturated monomers copolymerised; and
   (c) between 20% and 80% of a water dispersed carboxyl functional copolymer dispersant having an Acid No. greater than 30; where components (a), (b) and (c) equal 100%, and said polymeric binder is produced by dispersing the water dispersed copolymer dispersant and the unsaturated polyester into an aqueous polymerization medium, and emulsion copolymerising the ethylenically unsaturated monomers in the presence of the unsaturated polyester to coreact the ethylenically unsaturated monomers with the unsaturated polyester to form the aqueous emulsion copolymer polymeric binder.

9. A process of producing an aqueous dispersed, protective coating composition containing an emulsion copolymer polymeric binder substantially free of volatile organic compounds, the process comprising, (a) preforming a carboxyl functional epoxy-acrylic graft copolymer dispersant having an Acid No. greater than 30 and comprising by weight between 5% and 80% epoxy resin and between 20% and 95% copolymerised ethylenically unsaturated monomer including carboxyl monomer, the graft copolymer produced by in-situ, non-aqueous polymerisation of said monomers in the presence of the epoxy resin and at least 3% peroxide initiator based on the weight of said monomers copolymerised to produce the graft copolymer dispersant, and then dispersing the graft copolymer into water;

(b) preforming a low molecular weight unsaturated polyester having a weight average molecular weight between 1,000 and 3,000, the unsaturated polyester synthesised by esterifying excess molar equivalents of glycol and polyol with lesser molar equivalents of dicarboxylic acid, the molar equivalents comprising between,
  (i) greater than 50 mol percent of glycol,
  (ii) 10 and 35 mol percent aliphatic dicarboxylic acid,
  (iii) 5 and 35 mol percent aromatic dicarboxylic acid,
  (iv) 5 and 25 mol percent unsaturated dicarboxylic acid,
  (v) 0 and 3 mol percent polyol having three or more hydroxyl groups;

(c) dispersing the preformed unsaturated polyester of step (b) into the water containing the dispersed graft copolymer of step (a) along with emulsion ethylenic monomers, the emulsion ethylenic monomers comprising at least 20% styrene based on the weight of the emulsion ethylenic monomers copolymerised; and (d) emulsion copolymerising the emulsion ethylenic monomers in the presence of the water dispersed unsaturated polyester to addition copolymerise and crosslink the emulsion ethylenic monomers with the water dispersed unsaturated polyester to form the aqueous emulsion copolymer polymeric binder, the polymeric binder comprising by weight between 0.1% and 40% crosslinked preformed unsaturated polyester, between 20% and 80% emulsion copolymerised ethylenic monomers, and between 20% and 80% graft copolymer dispersant.

10. The process of claim 9, wherein the preformed unsaturated polyester in step (b) and emulsion ethylenic monomers are premixed prior to the step (c) of dispersing into water.

11. The process of claim 9, wherein the preformed unsaturated polyester of step (b) is dispersed into water, and then the emulsion ethylenic monomer are added to the water and emulsion copolymerised in the presence of the unsaturated polyester.

\* \* \* \* \*